May 3, 1955     W. C. SIEVERTS     2,707,605
AUTOMATIC PARACHUTE RELEASE MEANS
Filed March 29, 1952     2 Sheets-Sheet 1
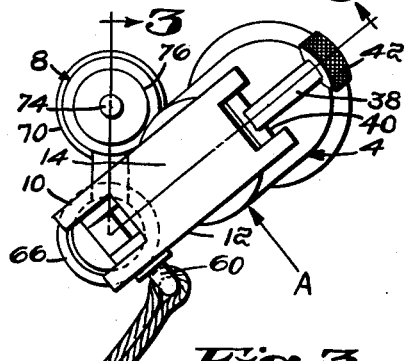
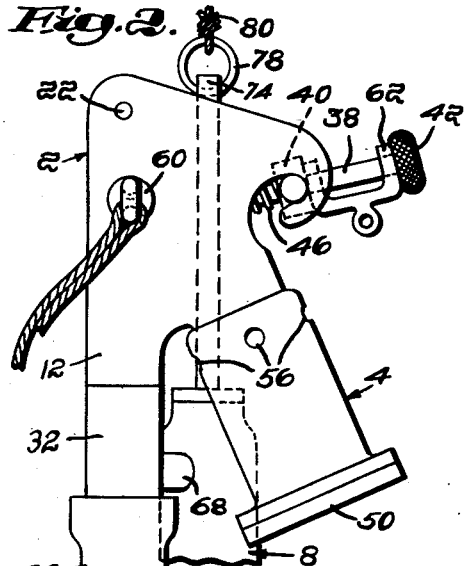
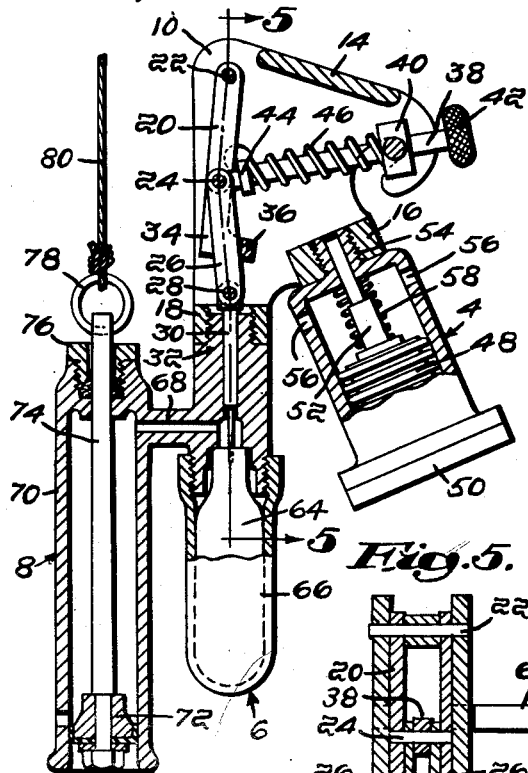
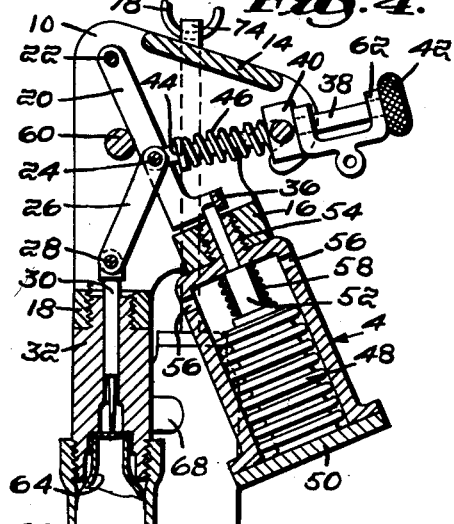
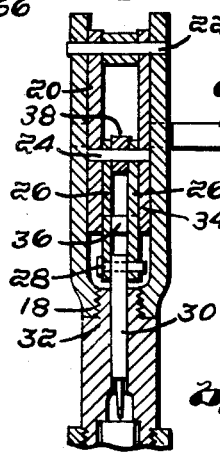
Inventor:
William C. Sieverts,
by Yardley Chittick
Attorney May 3, 1955 W. C. SIEVERTS 2,707,605
AUTOMATIC PARACHUTE RELEASE MEANS
Filed March 29, 1952 2 Sheets-Sheet 2
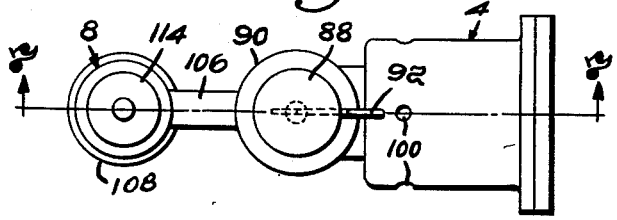
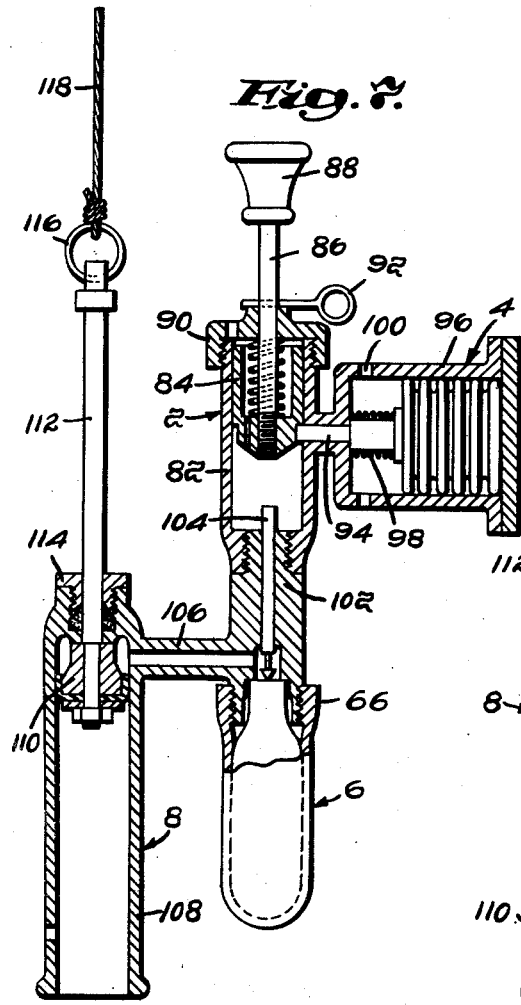
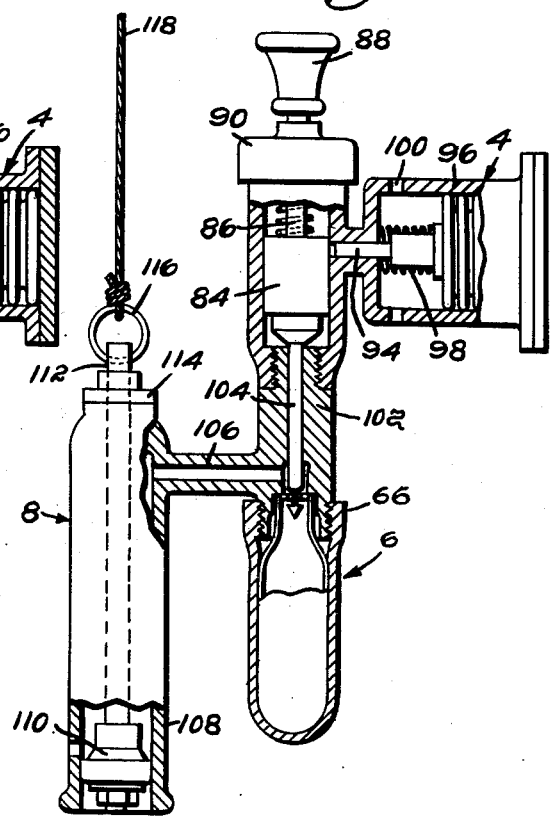
Inventor:
William C. Sieverts,
by Yardley Chittick
Attorney

United States Patent Office 2,707,605
Patented May 3, 1955

2,707,605

AUTOMATIC PARACHUTE RELEASE MEANS

William C. Sieverts, Kingston, Mass.

Application March 29, 1952, Serial No. 279,481

5 Claims. (Cl. 244—150)

This invention relates to mechanism for causing the automatic release of a parachute at a predetermined altitude while the wearer of the parachute is dropping freely through space.

Planes today utilize pressurized cabins or other types of oxygen supplying equipment for pilots and passengers so they may fly at heights where the oxygen is below normal human requirements. It often happens that a flyer may have to bail out of a plane at a height so great that he promptly loses consciousness in the rarified atmosphere. In such situations, it is desirable for the flyer to fall freely so as to reach as quickly as possible an altitude where normal breathing may be resumed. After reaching such level the parachute should then open for the remainder of the descent.

If the flyer has been rendered unconscious during the free fall from the very high altitude at which he bailed out, experience has shown that he probably will not regain consciousness, if at all, until very close to the earth, at which point his parachute might not be able to save him. Accordingly, therefore, it is imperative that means be provided for automatically opening the flyer's parachute at a predetermined altitude in the breathable area, thus stopping the free fall and giving the flyer ample opportunity to regain consciousness during the remainder of the descent to the ground.

Numerous devices have heretofore been proposed, designed to cause automatic opening of a parachute at a predetermined height, following a free fall from a higher altitude, but such devices have been unsuccessful for one reason or another and have not been put to use by the military services which have great need for such device.

According to the present disclosure, I have developed a device for the automatic opening of a parachute following a free fall from a higher altitude which is easy to manufacture, is of low cost, and has complete certainty of operation, without requiring any change in the parachute construction.

A further object of my invention is the provision of means for preventing premature functioning of the unit at any time before the flyer is ready to bail out. In addition, the unit may be made adjustable so that it can be set to open the parachute at any selected altitude within relatively narrow limits. This is possible because the unit is caused to function when the air pressure has increased to a predetermined point. Since the air pressure at any given altitude is known, the device accordingly may be set to function at any selected altitude.

Another object of the invention is to provide a device of the character described which may utilize as its activating force a common commercial article that is available for purchase in practically all parts of the world at this time. The preferred actuator herein referred to is a small cartridge of compressed carbon dioxide gas, the gas being compressed to such an extent that when released by actuation of the unit it will expand to a volume with sufficient pressure to move a piston through its stroke with enough velocity to cause complete actuation of the parachute rip cord. If the present invention is to be used under conditions of extreme cold, it might be desirable to substitute nitrogen for the carbon dioxide to prevent the formation of solid particles of $CO_2$ which is a well-known phenomenon of this gas when it expands rapidly into a very cold chamber.

These and other objects of the invention will become more apparent as the description proceeds with the aid of the accompanying drawings in which Fig. 1 is a plan view of a preferred form of the device.

Fig. 2 is an elevation looking in the direction of the arrow A, shown in Fig. 1, with the lower part of the unit broken away.

Fig. 3 is a vertical section on the line 3—3 of Fig. 1 showing the mechanism after it has been released and has functioned to move the piston downwardly through its full stroke.

Fig. 4 is a section on the line 3—3 of Fig. 1 showing the parts in latched position prior to operation and with both safety elements still in place.

Fig. 5 is a section on the line 5—5 of Fig. 3, the safety pin being shown adjacent the hole in the frame from which it had previously been removed.

Fig. 6 is a plan view of a modified form of the invention that utilizes a different type of means for actuating the puncturing pin.

Fig. 7 is a vertical section on the line 7—7 of Fig. 6 with the safety pin still in position and the unit still latched by the pressure operated mechanism.

Fig. 8 is a view similar to Fig. 7 showing the position of the parts after actuation of the unit with the piston having been moved through its full stroke.

In the preferred form of the invention, which is shown in Figs. 1 to 5, the device comprises a supporting frame generally referred to at 2, a bellows unit 4, a cartridge chamber 6 and a cylinder and piston unit 8. The parts are so inter-related that when the bellows in the bellows unit is compressed by increasing pressure to a sufficient degree, the actuating mechanism, carried by the supporting frame, will function to puncture the cartridge in the cartridge chamber from which high pressure gas will flow into the cylinder to actuate the piston. The piston rod, extending from the cylinder, is connected to the ring of the parachute and the movement of the piston will be such that the parachute rip cord will be positively and forceably drawn a sufficient distance to cause the parachute to open.

The supporting frame 2 comprises two side plates 10 and 12 connected together at the top by a web 14 and having at its lower portion a heavy crossbar 16 to which is affixed the bellows unit and another crossbar 18 to which is affixed the cartridge chamber.

Carried between the side plates 10 and 12 is a spring actuated mechanism for forcing a puncturing pin into the cartridge. These elements comprise a bifurcated arm 20, pivoted at the top at 22 and connected by means of another lower pivot 24 with a divided lower arm 26, pivoted at 28 to the upper end of puncturing pin 30. Pin 30 slides closely in a bearing 32 at the upper end of the cartridge chamber.

Arm 20 has an extension 34 with a crossbar 36 connecting the two sides of arm 20. Also, pivotally connected to pivot 24 between the sides of arm 26 is a shaft 38 slidable through a bearing 40, which bearing is pivoted at its ends in the side plates 10 and 12. At one end of shaft 38 is a finger-gripping element 42 and close to the other end is a stop 44. Between bearing 40 and stop 44 is a coiled spring 46, which when compressed will be as in Fig. 4 and when expanded as in Fig. 3.

In the bellows unit 4 is positioned a flexible sealed bellows 48 of conventional construction. This bellows is secured at its end to plate 50. The other end of the bellows has mounted thereon a latch pin 52 relatively large at its inner end and somewhat smaller in diameter at its outer end where it extends through a bearing surface 54. Openings 56 through the bellows unit housing permit atmospheric air to reach the exterior of the bellows. A small coiled compression spring 58 is utilized to exert a compressive force on the bellows to facilitate movement of pin 52 when pressure conditions are correct for actuation.

As can be seen in Fig. 4, with the bellows fully extended pin 52 will lie behind crossbar 36 to hold arm 20 to the right with spring 46 compressed and with puncturing pin 30 in raised position. In this position, two safety devices are utilized—one, a pin 60 which extends between plates 10 and 12 and insures that arm 20 cannot be moved to the left until pin 60 is removed, and the other a safety latch 62 in the form of a pair of spaced U-shaped forks which fit over shaft 38 between bearing 40 and the finger-gripping element 42.

Upon the removal of pin 60 and safety latch 62, the arm 20 remains held in the position of Fig. 4 solely by the engagement of pin 52 with crossbar 36. Thereafter, upon contraction of bellows 48 as it may be subjected to increasing atmospheric pressure, the pin 52 will move downwardly to clear crossbar 36, thereby permitting the toggle mechanism formed of levers 20 and 26 to be moved to the left by the expansion of spring 46 causing corresponding downward movement of puncturing pin 30.

Immediately below the puncturing pin 30 is the cartridge chamber 6 which contains therein a $CO_2$ cartridge 64, having its upper end forced against the upper end of the chamber by means of a screw threaded cap 66 which is removable whenever a new cartridge is to be inserted.

Gas escaping from the cartridge after the end has been punctured by pin 30 may flow to a pipe 68 which connects the upper end of the cartridge chamber with the piston and cylinder unit 8. In the cylinder 70 is a piston 72 having a piston rod 74 extending through a stuffing box 76 at the upper end of the cylinder. The piston rod is connected with a ring 78 that is attached to the rip cord 80 of the parachute. The piston rod may be of wire size.

In Fig. 3 the piston is in the position it would occupy after actuation of the device. Prior to actuation, the piston would be in the upper end of the cylinder with the ring 78 a corresponding distance away. The stroke of the piston is designed to be adequate to cause proper functioning of the rip cord 80.

The toggle mechanism in the form of arms 20 and 26 is so constructed that it moves from the inoperative position of Fig. 4 through dead center, at which point the pin 30 is at maximum down position and thence on to a slightly withdrawn position as shown in Fig. 3. At this latter position, movement stops by virtue of crossbar 36 coming into contact with arm 26. The purpose of this over travel beyond dead center is to insure that regardless of the type of puncturing pin that may be used, the pin will always be wtihdrawn slightly from the hole it has just made in the end of the $CO_2$ cartridge so that the gas may escape readily to enter the cylinder 70. The clearance between pin 30 and the sides of the opening made in the cartridge need only be a slight amount because of the extremely high gas pressure of the cartridge. This high pressure further insures that there will always be an adequate charge of gas to cause positive actuation of the piston whenever the toggle mechanism is released following the compression of the bellows brought about by increasing atmospheric pressure as the flyer falls freely toward the altitude at which the device is set to function.

A modified form of the invention is shown in Figs. 6, 7 and 8. In this construction the principles of operation are the same but a different type of mechanism for actuating the puncturing pin is used and the safety device is modified slightly.

The supporting frame 2 comprises a tube 82 in which is slidable a hammer 84. This hammer has extending upwardly therefrom a shaft 86 to which is affixed at the end a finger-grip 88. A coiled spring 90 is under compression when the hammer is in raised position as shown in Fig. 7 and upon release of the hammer is designed to drive the hammer downwardly to the position shown in Fig. 8. The hammer is retained in up position by a safety pin 92 and by pin 94 that is connected to the free end of bellows 96. The bellows in turn is mounted in the bellows unit 4 in the same manner that bellows 48 is mounted in the disclosures in Figs. 3 and 4. Coiled spring 98 assists in the actuation of pin 94 when the desired altitude is reached. An opening 100 permits atmospheric air to reach the exterior of the bellows.

At the lower end of supporting frame 2 is secured the cartridge chamber 6 by screw threaded engagement. The bearing element 102 carries puncturing pin 104 with the upper end thereof located where it will be struck by hammer 84 when the latter is driven downwardly by spring 90.

Connected with cartridge chamber 6 by a pipe 106 is the cylinder and piston unit 8. The cylinder 108 has therein a piston 110 to which is affixed a piston rod 112 extending outwardly through stuffing box 114. To the upper end of the piston rod is attached a ring 116 connected in turn to the rip cord 118 of the parachute.

Having described in detail the construction of my invention, I will now explain the manner in which it is utilized.

Considering the construction shown in Figs. 1 to 5, the unit is secured to the flyer's uniform in a position and in a manner whereby when actuated it can exert a positive pull on the rip cord in the proper direction and through the proper stroke. At the commencement of the flight, the ring 78 will be in up position with piston 72 at the upper end of cylinder 70. The toggle mechanism 20 and 26 will be latched as shown in Fig. 4 by pin 60 and safety latch 62. Pin 52 will be in released position because of the greater atmospheric pressure prevailing on the ground. After the flight commences and the plane reaches higher altitudes, the bellows 48 will expand to position pin 52 behind crossbar 36. At this altitude and above, the user may then withdraw one or both of the safety elements 60 and 62 as the toggle mechanism will be held as shown in Fig. 4 by pin 52. If the flyer is then forced to bail out while at an altitude so high that he would be in danger of blacking out as soon as his oxygen mask was removed, he may do so confident that the mechanism of the present invention will cause automatic release of his parachute when he has fallen to a predetermined height. That is to say, suppose it was desired to open the parachute at an altitude of 10,000 feet, bellows 48 would be designed or adjusted so that at that altitude and below the pressure thereon, acting in combination with spring 58, would be sufficient to move pin 52 downwardly just enough to clear crossbar 36. This would permit the toggle mechanism to function under the influence of spring 46 to pierce the $CO_2$ cartridge so that the escaping gas would then move the piston 72 to pull the rip cord, after which the flyer would then float to earth in the normal manner whether conscious or unconscious.

My device may also be used successfully with planes having pressurized cabins because customarily in such planes, the pressure in the cabin will not exceed the pressure which is found at approximately 10,000 feet. In other words, as soon as the plane, pressurized or unpressurized, is above 10,000 feet, the pin 52 will move to a position behind crossbar 36. Thereafter, the safety devices 60 and 62 may be removed while the flyer is still in the plane or, if preferred, one or both of the safety devices may be allowed to remain in safety position until the flyer has bailed out, at which time he will pull either the latch 62 or the pin 60 and latch 62, setting the unit for automatic actuation at 10,000 feet. During the period of the drop from the greater altitude to 10,000 feet, the flyer may or may not become unconscious. In either case, however, the parachute will automatically open at the proper altitude.

The foregoing explanation of the use of the construction shown in Figs. 1 to 5 also applies to the construction shown in Figs. 6, 7 and 8 and it is therefore believed that further explanation of the use of the latter form will be unnecessary. In this latter species, however, there is but a single safety device being in the form of pin 92 which is withdrawn from a corresponding hole in shaft 86. It will be understood that one of the two elements 60 and 62 could be eliminated, if desired, from the construction of Figs. 1 to 5.

It is my intention to cover all changes and modifications of the example of the invention herein chosen for purposes of the disclosure which do not constitute departures from the spirit and scope of the invention.

I claim:

1. Means for supplying a charge of compressed gas to a cylinder to actuate a piston therein when the surrounding gas pressure has increased from a lesser to a predetermined greater degree, said means comprising a pressure sensitive device, a linkage, a spring for forcing said linkage from a first retracted position through dead center on to a second retracted position, a puncturing pin actuated by said linkage, a sealed cartridge containing a charge of compressed gas and located where it may be pierced by said pin when said pin is actuated by said linkage and withdrawn slightly when said linkage reaches said second retracted position, a piston and cylinder, a piston rod on said piston, a sealed passage from said cartridge to said cylinder whereby gas released from said cartridge can flow to said cylinder and actuate said piston, a latch controlled by said pressure sensitive device to hold said linkage in said first retracted position with said spring compressed so long as said surrounding gas pressure is less than said predetermined degree, said pressure sensitive device arranged to release said linkage when said surrounding gas pressure has increased to said degree whereby said pin will be moved by said linkage to pierce said cartridge and said compressed gas will flow to said cylinder to actuate said piston.

2. Means for supplying a charge of compressed gas to a cylinder to actuate a piston therein when the surrounding gas pressure has increased from a lesser to a predetermined greater degree, said means comprising a pressure sensitive unit, a toggle linkage, a puncturing pin actuated by said toggle linkage, a spring for actuating said toggle linkage, means controlled by said unit for holding said pin in inoperative position with said spring compressed so long as said surrounding gas pressure is below said predetermined degree, a sealed cartridge containing a charge of compressed gas and located where it may be pierced by said pin when said spring is released by actuation of said unit upon the surrounding gas pressure reaching said predetermined degree, a piston and cylinder with a piston rod extending from said cylinder, and a sealed passage from said cartridge to said cylinder whereby gas released from said cartridge upon the actuation of said pin may enter said cylinder and move said piston and piston rod.

3. The construction set forth in claim 1, said pressure sensitive device comprising a bellows and said latch comprising a member actuated by said bellows for detachably engaging a member connected to said linkage.

4. Means for supplying a charge of compressed gas to a cylinder to actuate a piston therein when the surrounding gas pressure has increased from a lesser to a predetermined greater degree, said means comprising a cartridge chamber, a compressed gas cartridge in said chamber, a passage from said chamber to said cylinder, a pin for puncturing said cartridge, spring actuated means comprising a toggle linkage with overtravel, said pin being affixed to said toggle linkage, said toggle linkage when actuated by said spring causing said pin to puncture said cartridge and then to withdraw somewhat from the hole so formed in said cartridge, a pressure sensitive device having means associated therewith for restraining said spring actuated toggle linkage from causing said pin to puncture said cartridge so long as the surrounding gas pressure is less than a predetermined degree and for permitting said spring actuated toggle linkage to function whenever said gas pressure is greater than said predetermined degree, thereby to cause puncturing of said cartridge.

5. Means for supplying a charge of compressed gas to a cylinder to actuate a piston therein when the surrounding gas pressure has increased from a lesser to a predetermined greater degree, said means comprising a cartridge chamber, a compressed gas cartridge in said chamber, a passage from said chamber to said cylinder, a pin for puncturing said cartridge, spring actuated means for causing said pin to puncture said cartridge and then to withdraw somewhat from the hole formed in said cartridge, said spring actuated means comprising a linkage giving positive mechanical puncturing and withdrawal movement of said pin with respect to said cartridge, said puncturing and withdrawal movement occurring while said spring is causing movement of an element of said linkage continuously in one direction, a pressure sensitive device having means associated therewith for restraining said spring actuated means from causing said pin to puncture said cartridge so long as the surrounding gas pressure is less than a predetermined degree and for permitting said spring actuated means to function whenever said gas pressure is greater than said predetermined degree, thereby to cause puncturing of said cartridge.

References Cited in the file of this patent

UNITED STATES PATENTS

| 1,791,136 | Magin | Feb. 3, 1931 |
| 2,324,744 | Ward | July 20, 1943 |
| 2,470,457 | Bancora | May 17, 1949 |

FOREIGN PATENTS

| 284,379 | Italy | Apr. 10, 1931 |
| 615,054 | Great Britain | Dec. 31, 1948 |